United States Patent [19]

Powers

[11] Patent Number: 4,544,265
[45] Date of Patent: Oct. 1, 1985

[54] GROOVED VACUUM BELT DOCUMENT HANDLING SYSTEM

[75] Inventor: Edward A. Powers, Penfield, N.Y.
[73] Assignee: Xerox Corporation, Stamford, Conn.
[21] Appl. No.: 534,446
[22] Filed: Sep. 21, 1983
[51] Int. Cl.[4] ............................................. G03B 27/62
[52] U.S. Cl. ...................................................... 355/76
[58] Field of Search ....................... 355/73, 76, 91, 93, 355/94

[56] References Cited

U.S. PATENT DOCUMENTS

| | | | |
|---|---|---|---|
| 3,677,643 | 7/1972 | Sagawa | 355/91 |
| 3,963,345 | 6/1976 | Stemmle et al. | 355/50 |
| 4,047,812 | 9/1977 | Hogan | 355/76 |
| 4,412,738 | 11/1983 | Ahern et al. | 355/76 |

Primary Examiner—L. T. Hix
Assistant Examiner—Brian W. Brown

[57] ABSTRACT

A document handling system in which an air permeable belt advances documents to an imaging station of a copying machine. The belt reflects light rays transmitted thereto except in grooved areas which have been rendered at least partially transmissive to light. These grooved areas contain vacuum apertures in the belt. Semi-circular air channels in the vacuum plenum in concert with the belt apertures provide a means to hold the document to the belt. Light rays transmitted through the partially transmissive grooved areas are reflected from the air channel to back-illuminate the aperture/groove area thereby reducing background shadows associated with these aperture areas. A vacuum system is in communication with the belt for retaining the documents thereon. The vacuum system is arranged to receive the light rays transmitted through the belt and diffusely reflect the light rays incident thereon back through the belt.

9 Claims, 3 Drawing Figures

GROOVED VACUUM BELT DOCUMENT HANDLING SYSTEM

BACKGROUND AND PRIOR ART STATEMENT

This invention relates generally to an electrophotographic printing machine and, more specifically, to a document handling system which includes a grooved vacuum belt for transporting original documents to an exposure station.

For the higher speed electrophotographic printing machines now in commercial use, it is increasingly desirable to provide for the automatic handling of individual original documents being copied in order to utilize these copiers to the fullest extent. However, the characteristics of the original documents can vary widely, i.e. in size, weight, thickness, material, condition, humidity, age, etc. These documents may have curls, wrinkles, tears, cutouts, overlays, paste ups, tapes, staples, abrasive areas or other irregularities. Under all of these conditions it is desirable to be able to semi-automatically or automatically copy a set of such documents. Presently, there are various types of document handling systems which move original documents over the platen. These may be made from single or multiple belts which utilize vacuum retaining forces to secure the document against the belt.

Generally, the belt has vacuum apertures extending through the belt which cooperate with the vacuum-producing means to create a suctional force against documents fed between the belt and a document platen. One problem with apertured document handlers is that, when light weight documents are being copied (e.g. 9-13 pound range), the apertures create a high density differential relative to the belt with the result that output copy has undesirable background spots or shadows corresponding to the aperture areas. Various expedients to minimizing this background problem have been disclosed in prior publications, for example, U.S. Pat. No. 3,677,643 (Sagana), U.S. Pat. No. 4,047,812 (Hogan), and U.S. Pat. No. 3,963,345 (Stemmle). In these prior art systems, the document handler belt is reflective and the plenum areas adjacent (and above) the apertured area are made reflective in order to back illuminate the aperture thereby reducing the density differential. These techniques have not, however, been completely successful.

A second background minimization technique is to utilize a translucent, document belt in combination with a reflective grooved channel adjacent the belt apertures as disclosed in copending U.S. patent application Ser. No. 191,560 filed Sept. 29, 1980. While this technique satisfactorily resolves the aperture show-through problem, the transparent/translucent belt is susceptible to contamination at the plenum/belt interface. Thus dirt, scratches, etc. on the belt surface will print out as undesirable background on output copy.

In accordance with the present invention there is provided a document handling system of the type in which a document is transported to an imaging station of an electrophotographic printing machine comprising:

at least one document transport belt having a plurality of apertures therethrough, said belt having a reflective surface except for areas surrounding said apertures, said areas being at least partially transmissive to light, and vacuum means in communication with said belt for retaining the document therein, said means having reflective areas in optical communication with said belt aperture areas.

Other aspects of the present invention will become apparent as the following description proceeds and upon reference to the drawings, in which.

DESCRIPTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims. All references cited herein, and their references, are incorporated by reference herein for appropriate teachings of additional or alternative details, features, and/or technical background.

Figure 1:
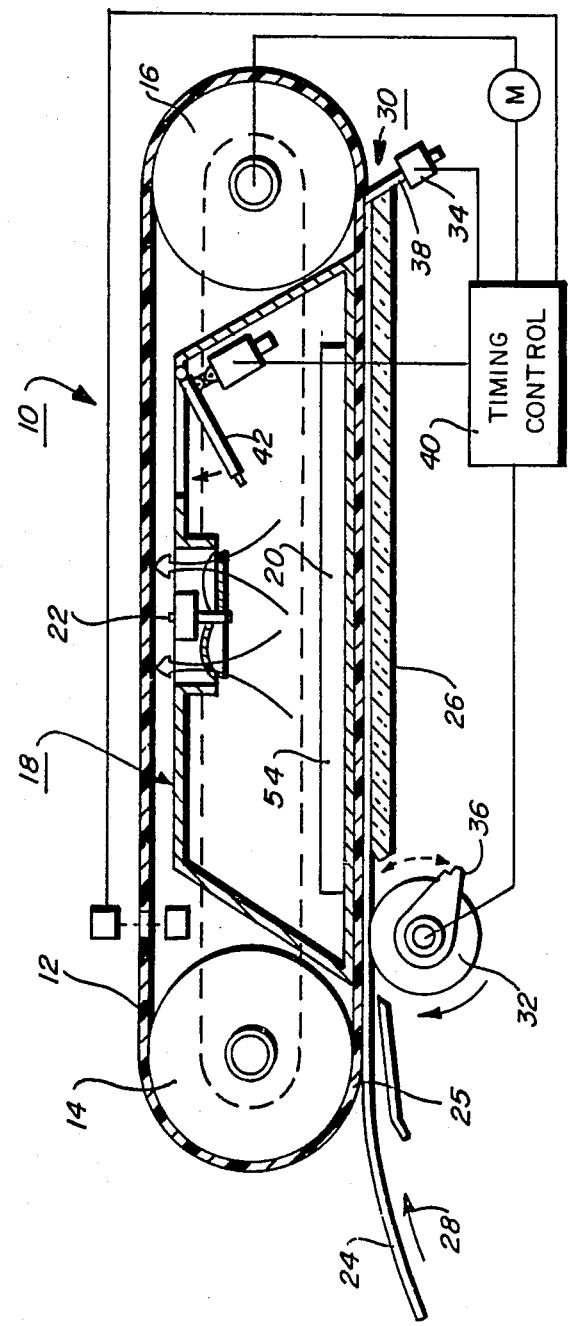
FIG. 1 is an elevational view, in section, showing the document handling system of the present invention.

For a general understanding of the features of the present invention, reference is made to the drawings. In the drawings like reference numerals have been used throughout to designate identical elements. FIG. 1 schematically depicts an illustrative document handling system for use in an electrophotographic printing machine for advancing original documents to the imaging station thereof. It will become evident from the following discussion that the document handling system of the present invention is equally well suited for use in a wide variety of printing machines and is not necessarily limited in its application to the particular embodiment depicted herein.

As shown in FIG. 1, document handling apparatus 10 includes a reflective document belt 12 supported and driven by rollers 14 and 16. The document handling system described hereinafter is a semi-automatic system which is illustrated for simplicity. However, it will be appreciated that the invention is fully applicable to various recirculating document handling systems used for precollation copying.

Document handling apparatus 10 includes a vacuum manifold 18 with a plenum 20 for applying a vacuum to the backside of apertured vacuum document belt 12. A vacuum is created by blower 22. Document belt 12 and plate 20 are mounted so that a document 24 may be transported at surface 25 of belt 12 closely and evenly spaced above transparent platen 26 of the electrophotographic printing machine. The document may be copied within the depths of focus of the optical system of the electrophotographic printing machine through transparent platen 26.

Document 24 is inserted onto belt 12 at a document input area station 28 positioned near the upstream end of belt 12, either manually or automatically. The documents may then be ejected from an output area 30 located at the downstream end of belt 12 and platen 26. Alternatively, the belt drive may be reversed to eject the document from input area 28.

Document 24 may be registered on platen 26 through the utilization of a two-registration gate system, an upstream registration gate 32 and downstream registration gate 34. Registration gates 32 and 34 have registration fingers 36 and 38, respectively, which move into and out of the path of document 24 for registration. Either one or both of the registration gates may be used. Both of the illustrated registration gates as well as belt drive M may be conveniently controlled by timing control 40. Preferably timing control 40 is incorporated in a general central copier microprocessor control with programming. However, timing and control may be provided by any desired logic system, commercial timing circuits, multiple lobe cams on a timing shaft, or any other suitable timing system which provides the desired sequence of events.

In one mode of registration, gate 32 pre-registers the document to a selected fixed position on the belt upstream of the platen. The document is then driven a fixed distance from gate 32 downstream over the platen without slippage. Copying takes place after advancement into the registration position. In a system of this type, downstream registration gate 34 is not required. However, if desired, it may be additionally provided for final or re-registration. Alternatively, only the downstream registration gate 34 would be utilized, i.e. the document would not be pre-registered. In this case, the document is driven by belt 12 over the platen until the lead edge of the document contacts raised registration fingers 38 which are positioned at the downstream edge of platen 26. The document slips relative to belt 12 so that it may be deskewed and be fully aligned against registration fingers 38. For this registration mode, there is provided an intermittently operable vacuum control valve 42. Valve 42 may be solenoid actuated by timing control 40. Opening of valve 42 reduces the vacuum in manifold 18 to permit the document on belt 12 to slip as it is being aligned by registration finger 38. This valving operation may also be done during initial loading or pre-registration of the document onto the belt at the input area 28. In a system of this type, a relatively low parallel pressure vacuum system 22 (FIG. 1) may be employed. For example, a manifold vacuum level of not substantially greater than 25 millimeters of water and an air flow of somewhat more than only $1.8 \times 10^{-3}$ cubic meters per second would be sufficient. This system allows an effective vacuum holding force with low pressure and low air flow rates.

Downstream registration gate 34 is conventionally opened by a solenoid or other actuator linearly pulling registration finger 38 out of the path of the document. After the document is copied, it may be ejected in either direction from the platen by the belt drive. Upstrean registration gate 32 conventionally operates by rotating into and out of the document path with a clutch driven cam or solenoid.

Figure 2:
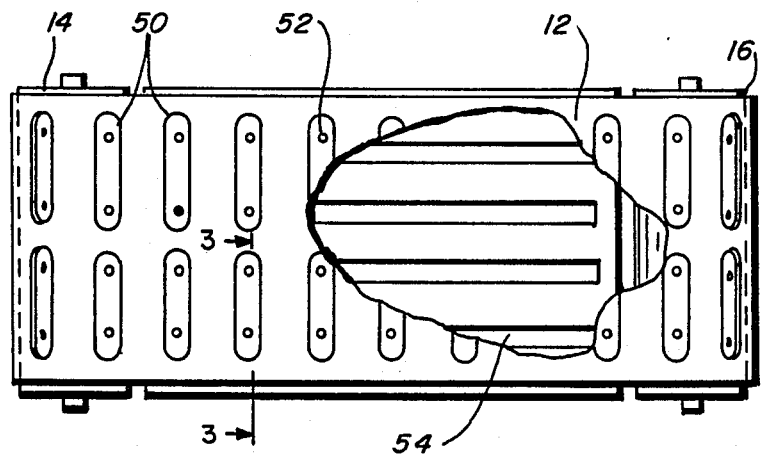
FIG. 2 is a top view of the belt used in the FIG. 1 document handling system.
Figure 3:
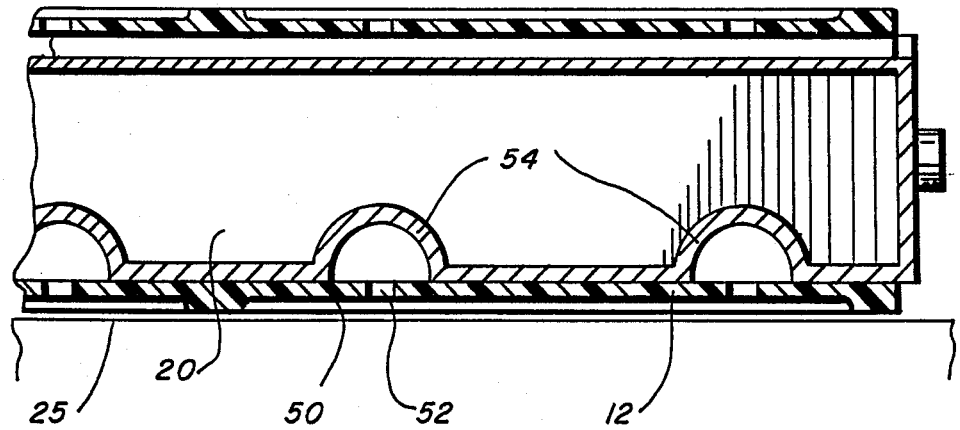
FIG. 3 is an enlarged fragmentary sectional elevational view taken along the lines 3—3 of the FIG. 2 belt.

Referring now to FIGS. 2 and 3, belt 12 is preferably made from an elastomeric material such as Mylar. Document support surface 25 is coated with a high reflectivity material such as *white* Krylon #1501. As shown in FIG. 2 belt 12 has a plurality of elongated shallow grooves 50. Grooves 50 extend linearly transverse to the direction of movement of belt 12. Grooves 50 are below the planar document transporting surface 25 of belt 12 and are pneumatically separated from each other. Recessed within the base area of each groove are a plurality of vacuum apertures 52. The apertures communicate the vacuum supplied by plenum 20 into the grooves 50 which, in turn, distribute the vacuum under the document and towards the edge thereof.

Referring now to FIGS. 2 and 3, plenum 20 has a plurality of elongated air channels 54, preferably having an arcuate semi-circular cross-section as shown in FIG. 3. Channels 54 extend linearly in the direction of belt 12 movement. The base of the channels is between 0.5 and 2.0 mm below the plenum/document interface surface and preferably towards the higher end to create a more efficient vacuum. The surfaces of channels 54 are coated with a diffusely reflective material providing a reflectivity greater than 80%.

Turning now to a more detailed consideration of grooves 50, the grooves, in one embodiment, are formed by manufacturing belt 12 with thinner areas in the designated groove channels. In a second embodiment, the belt is manufactured so as to create translucent thin strips in the designated groove channel areas. The grooves are preferably formed with sloped side walls with the base of the grooves preferably between 0.1 mm and 0.4 mm below the surface 25 of belt 12. The width of grooves 50 is preferably less than 5 mm. The purpose of either groove embodiment, in addition to the vacuum distribution, is to transmit a portion of the light passing through a relatively thin document onto the overlying channel 54 area. This light passing through aperture 52 and grooves 50 is efficiently reflected from the semi-circular channel 54 to back illuminate the groove/aperture area. A 25% light transmission has been found to be effective. This back reflection minimizes the density differential between the aperture and the surrounding area thereby minimizing the hole shadow development at the photoreceptor.

While the invention may be practiced effectively with a thinner belt material forming grooves 50, the partially reflective, partially transmissive embodiment allows more light to pass through the groove/aperture area and permits channels 54 to be formed with a deeper base. Ordinarily, the channels should be as shallow as possible because deep gooves trap more light and create more severe hole development problems. This tendency is offset by the increased light transmission through the groove/aperture area made possible with the present invention. And, although channels 54 are shown as having a semi-circular configuration, other designs e.g. a groove having rectangular cross-section may be used with some reductions in efficiency.

It is therefore, evident that there has been provided, in accordance with the present invention, a document handling system which fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. A document handling system of the type in which a document is transported to an imaging station of an electrophotographic printing machine comprising:
   at least one document transport belt having a plurality of apertures therethrough, said belt having a reflective surface except for areas surrounding said apertures, said areas being at least partially transmissive to light, and
   vacuum means in communication with said belt for retaining the document therein, said means having reflective areas in optical communication with said belt aperture areas.

2. A system according to claim 1 wherein said areas surrounding said belt apertures have a groove configuration.

3. A system according to claim 2 wherein said grooves are translucent.

4. A system according to claim 3 wherein said translucent grooves have a transmissivity characteristic of 25% minimum.

5. A system according to claim 2 wherein said grooves have a depth of between 0.1 and 0.4 mm.

6. A system according to claim 1 wherein said vacuum means includes a plurality of air channels extending in a path adjacent to and parallel with said apertured grooves, said air channels having a reflective surface so as to back-illuminate light transmitted through said partially transmissive aperture areas.

7. A system according to claim 4 wherein said air channels have an arcuate configuration.

8. A system according to claim 6 wherein said air channels have a depth of between 0.5 and 2.0 mm.

9. A document handling system of the type in which a document is transported to an imaging station of a reproduction machine comprising:

a document transport belt having a plurality of apertured grooves on the surface thereof, said belt having a reflective surface except for a partially transmissive area incorporated into said grooves, and vacuum means in communication with said belt, said vacuum means including a plurality of arcuate air channels extending in a path adjacent to and perpendicular with said apertured grooves, said air channels presenting a reflective surface to light transmitted through said partially transmissive grooved areas.

* * * * *